Figure 1:
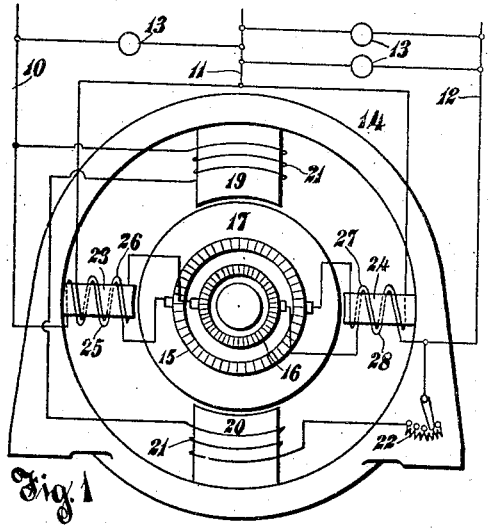

G. B. SCHLEY.
DYNAMO ELECTRIC MACHINE.
APPLICATION FILED OCT. 31, 1906.

925,392.

Patented June 15, 1909.

Witnesses

Inventor
George B. Schley
By Chas. E. Lord
Attorney

UNITED STATES PATENT OFFICE.

GEORGE B. SCHLEY, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DYNAMO-ELECTRIC MACHINE.

No. 925,392.

Specification of Letters Patent.

Patented June 15, 1909.

Application filed October 31, 1906. Serial No. 341,373.

*To all whom it may concern:*

Be it known that I, GEORGE B. SCHLEY, a citizen of the United States, residing at Norwood, in the county of Hamilton and State of Ohio, have invented certain new and useful Improvements in Dynamo - Electric Machines, of which the following is a full, clear, and exact specification.

My invention relates to dynamo-electric machines for multiple wire systems of distribution.

In multiple wire systems, such as the well known three wire systems, when single generators have been used to supply the whole system, trouble has been experienced from sparking at the commutator brushes due to the uneven division of the load between the different sets of mains. A number of such multiple wire generators have been devised by various inventors, and my present invention, which is applicable to any of them, has for its main object the prevention of sparking at the brushes of such machines. This is accomplished by having auxiliary field windings either of the distributed compensating type for preventing distortion of the field due to armature reaction, or of the concentrated commutating type wound on auxiliary poles for assisting the act of commutation or both. These auxiliary windings are so connected with the multiple wire system as to produce the desired result.

My invention is here described and illustrated with particular reference to three wire systems, but it is equally applicable to other multiple wire systems.

Broadly my invention comprises a three wire dynamo provided with field windings for preventing sparking at the brushes.

In another aspect my invention comprises a three wire dynamo having main and auxiliary field poles, the sum of the strengths of said auxiliary field poles being proportional to the total watts of the dynamo.

In still another aspect my invention comprises a three wire generator having main and commutating field poles, each of said commutating poles having two windings, the sum of the ampere turns of which remains constant for a constant total load on the generator regardless of the even or uneven distribution of said load.

Considered still more specifically my invention comprises a generator supplying a multiple wire system of distribution, said generator having main and commutating field poles, and a plurality of windings for said commutating field poles, each of which carries a current in proportion to the load between two adjacent mains of the multiple wire system.

Many other features of my invention will appear from the description and drawings and will be pointed out in the claims.

Figure 3:
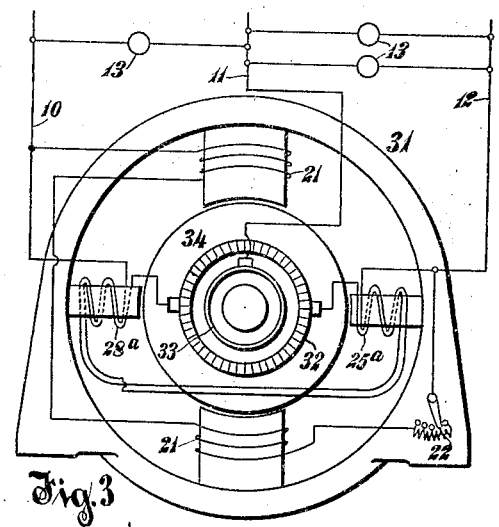
Figure 2:
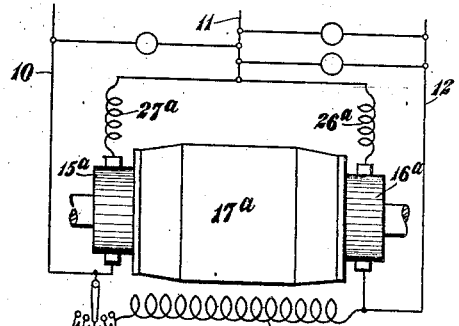
Figure 4:
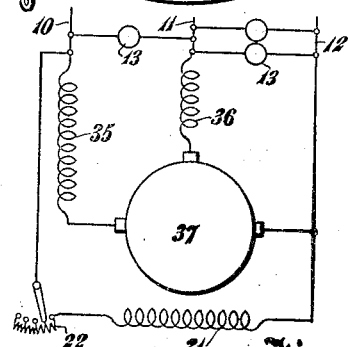
Figure 5:
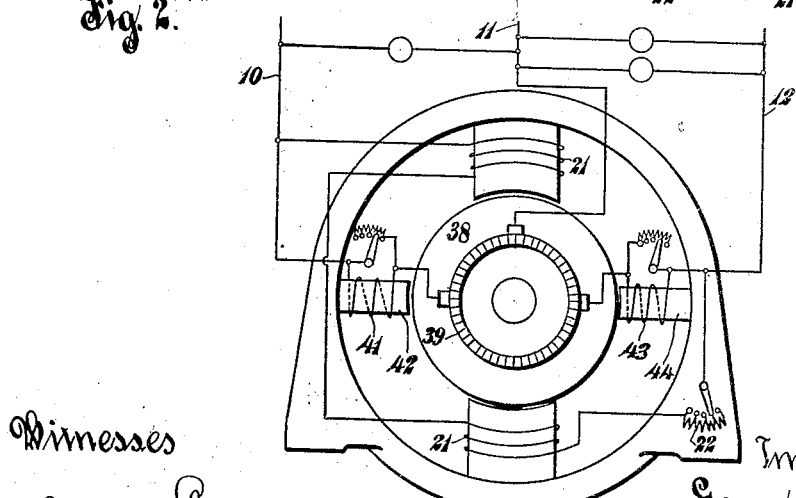

Figure 1 shows the application of my invention to a double-commutator three wire dynamo. Fig. 2 shows diagrammatically a somewhat simpler arrangement of circuits for such a double-commutator three wire machine. Fig. 3 shows my invention applied to a three wire dynamo in which the neutral wire is connected to the armature through a slip ring. Fig. 4 shows diagrammatically another arrangement of the circuits, the neutral wire in this case being connected to a middle commutator brush; and, Fig. 5 shows a modification in which each commutating field pole has but a single winding.

In the drawings 10, 11, and 12 designate the three mains or conductors of a three-wire system of distribution. Between adjacent mains, lamps 13 or other electro-receptive devices may be connected.

In Fig. 1, the three wire system is supplied by the generator 14 having two commutators 15 and 16, which for convenience of illustration are shown one within the other, although generally in practice one would be at each end of the armature as shown in Fig. 2. The commutator 15 is connected between the mains 10 and 11, while the commutator 16 is between the mains 11 and 12. The armature 17, to which these commutators are connected, may be of any desired construction. The main field poles 19 and 20 are shown with a shunt winding 21, connected between the outside mains 10 and 12 and adjustable by rheostat 22; but any other type of main field winding may be used. This same shunt main field winding 21 is used in all the figures of the drawings. Besides the main field poles there are auxiliary commutating field poles 23 and 24 which in the well known manner are placed over the coils of the armature in which commutation is being effected. The commutating field pole 23 has two identical assisting windings 25 and 26, the first connected in series between the commutator 15 and the outside main 10 and the second between the commutator 16 and the neutral wire 11. Similarly there are two identical assisting windings 27 and 28 for the other commutating field pole 24, the winding 27 being in series between the commutator 15 and the neutral main 11, and the winding 28 in series between the commutator 16 and the other outside main 12. These different commutating windings may be adjustable if desired, as shown in Fig. 5. Thus the commutating windings 25 and 27 carry the whole or a proportionate part of the current supplied from the commutator 15 and demanded by the load between the mains 10 and 11, while the commutating windings 26 and 28 carry the whole or a correspondingly proportionate part of the current supplied from the commutator 16 and demanded by the load between the mains 11 and 12. Hence, the sum of the ampere turns in the whole winding of any commutating pole, say of pole 23, and therefore the magnetic strength of said pole, varies with the total load on the generator 14, and remains constant for a constant total load thereon, regardless of the even or uneven division of said load between the two sides of the system. For if the load between the mains 11 and 12 is increased above that between the mains 10 and 11, the ampere turns of the windings 26 and 28 are correspondingly increased above those of windings 25 and 27, respectively and collectively, and the total effect of the two sets of windings on each pole remains in proportion to the total output of the generator. Thus commutation is properly taken care of. The effect of the commutating poles on the armature coils undergoing commutation is so well known as to require no explanation.

If desired, instead of having the two windings 25 and 27 on opposite electrical sides of the commutator 15, they may be combined and placed both on one side thereof; similarly with the windings 26 and 28 and the commutators 16. It is immaterial which side this is. In Fig. 2 such an arrangement is shown, the two commutating windings 27$^a$ and 26$^a$ being connected between the neutral wire 11 and the two commutators 15$^a$ and 16$^a$ respectively of the armature 17$^a$. Equal parts of each of these commutating windings should be placed on each commutating pole of the dynamo as indicated in Fig. 3.

In Fig. 3, a different type of three wire generator is illustrated. This generator 31 has but one commutator 32, the brushes of which are connected to the outside mains 10 and 12 of the three wire system. The neutral main 11 is connected to a slip ring 33, the potential of which is maintained midway between the potentials of the two brushes by any desired mode of connecting the slip ring to the armature 34. Modes of connecting the slip ring to the armature to obtain this result have been devised by others and I therefore do not claim any specific mode of making such connections. In series in the outside mains, between the brushes and the translating devices, are the commutating windings 25$^a$ and 28$^a$. The connections of these windings correspond to those of the windings 25 and 28 in Fig. 1. Each of these identical commutating windings is divided into a number of equal parts equal to the number of commutating poles, here shown as two, and one part of each winding is placed on each commutating pole. The action of the commutating field windings and poles is precisely similar to that of those in Fig. 1, for it is only necessary that each winding on each commutating pole should carry a current proportional to the load between two adjacent mains of the system.

In Fig. 4 is shown a somewhat different arrangement of circuits. Instead of placing the two equal commutating windings in the two outside mains, one commutating winding 35 with twice the number of turns as before is placed in one outside main, say 10, and a second commutating winding 36 with half the number of turns of 35, is placed in the neutral wire. Equal fractional parts of each of the windings 35 and 36 are placed on each commutating pole. The neutral wire is shown in this figure connected to a brush placed midway between the positive and negative brushes on the single commutator 37. The winding 36 is inactive when the load is evenly divided between the two sides of the system, and the effect of the winding 35 is the same as though it were half in each outside main. The winding 36 is so connected that when the load is heavier between the mains 11 and 12 it assists the winding 35, and when the load is heavier between the mains 10 and 11 opposes it. The number of turns of the winding 36 being half that of winding 35, it follows that the sum of the ampere turns of the two windings is proportional to the total load on the generator, and is constant for a constant load, regardless of how the load is divided. Thus this modification is virtually the equivalent of those shown in the other figures and may in some instances be preferred to it.

In Fig. 5 there is shown a modification in which each commutating pole has but one winding. The armature 38 has but one commutator 39 upon which bear the main brushes connected to the outside mains and the intermediate brush connected to the neutral wire. There are a number of such three wire dynamos. In the main 10 is the single winding 41 of the commutating pole 42 and in the main 12 is the single winding 43 of the commutating pole 44. These two windings are preferably identical. With this arrangement the pole 42 has a strength proportional to the current between the mains 10 and 11, or that commuted under the positive brush, while the pole 44 has a strength proportional to the current between the mains 11 and 12, or that commuted under the negative brush. With some armature windings this arrangement may be especially advantageous.

The different arrangements of connecting the commutating windings here shown with special types of three wire dynamos are not only adapted for the type of machines with which they are shown but for other types as well. The arrangements of Figs. 1 and 2 are particularly adapted to double commutator machines. The arrangements shown in the other figure are capable of use without change with any form of three wire dynamo.

Although for simplicity, only bipolar machines have been described and illustrated my invention is equally adapted to multipolar dynamos.

The invention has been particularly described with reference to generators. Any of the machines shown, however, may be used as a motor. When I use the term dynamo or dynamo-electric machine in this description and in the claims, I intend it to be broad enough to cover both generators and motors.

In using the term "to vary as" in any of its forms, I do not wish to limit myself to exact mathematical proportion. When the latter is meant the term "proportional" or "in proportion" is used.

My invention is equally applicable to other forms of anti-sparking winding than the particular commutating winding which has been particularly illustrated and described, such for instance as a distributed compensating winding for preventing distortion of the field due to armature reaction.

In the claims the terms "three wire dynamo" or "three wire generator" are used to denote a dynamo or a generator which is adapted for use in connection with the three mains of a three wire system. Although a three wire system has been especially described my invention is equally applicable to other multiple conductor systems.

Many other modifications in the precise arrangements here shown and described may be made without departing from the spirit and scope of the invention and in the following claims I aim to cover my invention broadly.

What I claim as new is:—

1. A three-wire dynamo having main and commutating field poles, and windings for commutating poles, the sum of the strengths of said commutating poles being constant for a given total load on the dynamo.

2. A three-wire dynamo having main and commutating field poles, and windings for the commutating poles, the sum of the strengths of said commutating poles varying in direct proportion to the total energy of the dynamo.

3. A three wire generator having main and commutating field poles, each of said commutating poles having two windings, the sum of the ampere turns of which remains constant for a constant total load on the generator regardless of the even or uneven distribution of said load.

4. A three-wire dynamo having main and commutating field poles, each of said commutating poles having a plurality of windings, the strength of the commutating poles varying with the total energy of the dynamo.

5. A dynamo connected to a three wire system of distribution, said dynamo being provided with commutating field poles and windings for said poles, said windings being divided into two parts respectively connected in different mains of the three wire system.

6. A dynamo connected to a three wire system of distribution, said dynamo having main and commutating field poles provided with windings, portions of the windings of the commutating poles being in each outside main of the three wire system.

7. A three wire system of distribution supplied by a generator, said generator having main and commutating field poles, one of said commutating poles having a winding in one outside main of the three wire system, and another a winding in the other outside main thereof.

8. A dynamo connected to a multiple wire system of distribution, said dynamo having main and commutating field poles provided with windings, the windings for said commutating field poles having a plurality of parts respectively connected in different mains of the multiple wire system.

9. A dynamo connected to a multiple wire system of distribution, said dynamo having main and commutating field poles, and each of said commutating field poles having two windings, one in each outside main of the multiple wire system.

10. A generator supplying a multiple wire system of distribution, said generator having main and commutating field poles, and a plurality of windings for said commutating field poles, each of which windings carries a current in proportion to the load between two adjacent mains of the multiple wire system.

11. A generator supplying a three wire system of distribution, said generator being provided with main and commutating field poles and windings therefor, the windings for said commutating field poles being divided into two parts, each of which carries a current in proportion to the load on one side of the three wire system.

12. A three wire dynamo having main and auxiliary field poles, and windings on the auxiliary field poles for making the sum of the strengths of the latter proportional to the total watts of the dynamo.

13. A three wire dynamo provided with main and auxiliary field poles, and windings on said auxiliary field poles for making the latter individually have a strength in direct proportion to the total load on the dynamo.

14. A three-wire dynamo having main and auxiliary field poles, each of said field poles having a plurality of windings, the sum of the ampere turns of said windings being constant for a given total load while the ratio between the ampere turns of the different parts may vary.

15. A dynamo connected to a multiple wire system of distribution, said dynamo having main and auxiliary field poles, windings thereon, the windings of the auxiliary poles being divided into a plurality of parts which are connected in different mains of the system.

16. A dynamo connected to a three wire system of distribution, said dynamo having main and auxiliary field poles, and the auxiliary field poles having windings of which part is in each outside main.

17. A generator supplying a multiple wire system of distribution, said generator having main and auxiliary field poles provided with windings, the winding of each auxiliary pole being divided into a plurality of parts, and the ampere turns of each part being proportional to the load between two adjacent mains of the multiple wire system.

18. A dynamo connected to a three wire system of distribution, said dynamo having main and auxiliary field poles, the auxiliary field poles having windings the total ampere turns of which vary in proportion to the sum of the currents in the two outside mains of the three wire system.

19. A three wire dynamo having main and anti-sparking field windings, the ampere turns of said anti-sparking windings being proportional to the total watts of the dynamo.

20. A three wire dynamo having main and anti-sparking field windings, the total ampere turns of said anti-sparking field windings remaining constant for a given total load on the machine.

21. A three wire generator having main and anti-sparking field windings, said anti-sparking field windings being divided into two parts, the sum of the ampere turns of which remains constant for a constant output of the generator.

22. A three wire dynamo having a main field winding and two anti-sparking field windings, each of the latter being in series with one of the two brushes of the dynamo between which there is the greatest difference of potential.

23. A dynamo connected to a multiple wire system of distribution, said dynamo being provided with anti-sparking field windings divided into a plurality of parts which are in different mains of the multiple wire system.

24. A dynamo connected to a three wire system of distribution, said dynamo having a plurality of anti-sparking field windings, one of which is in each of the outside mains of the three wire system.

25. A generator supplying a three wire system of distribution, said generator having main and anti-sparking field windings, and said anti-sparking field windings being divided into two parts, each of which carries a current in proportion to the load on one side of the system.

26. A generator supplying a three wire system of distribution, said generator having main and anti-sparking field windings, and said anti-sparking field windings having two parts, each of which carries the current supplied to one side of the three wire system.

27. A generator supplying a multiple wire system of distribution, said generator having main field windings and anti-sparking field windings, and said anti-sparking windings being divided into a plurality of parts, each of which parts has a number of ampere turns in proportion to the load between two adjacent mains of the multiple wire systems.

28. A dynamo connected to a three wire system of distribution, said dynamo having main and anti-sparking field windings, said anti-sparking windings being divided into a plurality of parts, and the sum of the ampere turns of said parts varying as the total load on the three wire system while the ratio between the ampere turns of the different parts varies as the ratio between the loads on the two sides of the systems.

29. A generator supplying a multiple wire system of distribution, said generator having main and anti-sparking field windings, said anti-sparking field windings being divided into a plurality of parts, the ampere-turns of each part being proportional to the load between two adjacent mains of the multiple wire system, and the ampere turns of the whole anti-sparking winding being proportional to the total load on the system.

In testimony whereof I affix my signature, in the presence of two witnesses.

GEORGE B. SCHLEY.

Witnesses:
ARTHUR F. KIVIS,
OLIVER W. SHARMAN.